Jan. 13, 1970  R. G. MEYERAND, JR., ET AL  3,489,933
AC MAGNETOHYDRODYNAMIC GENERATOR UTILIZING A BISTABLE VALVE
Filed Nov. 2, 1965
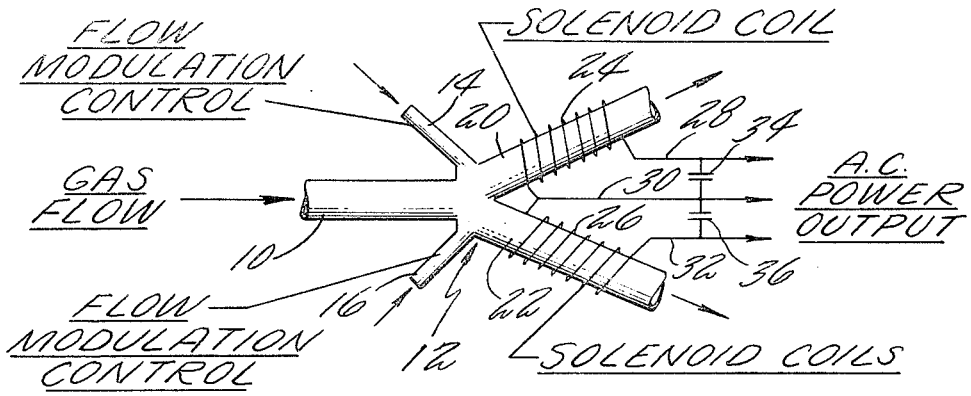
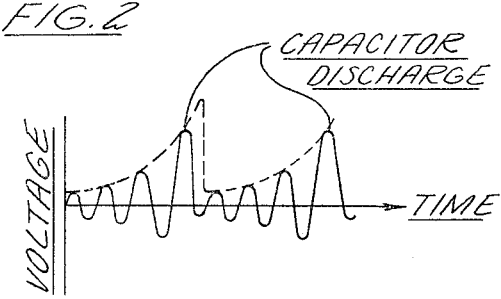
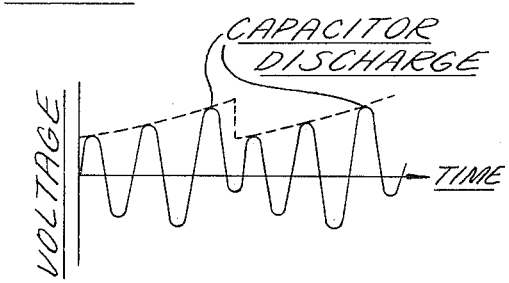
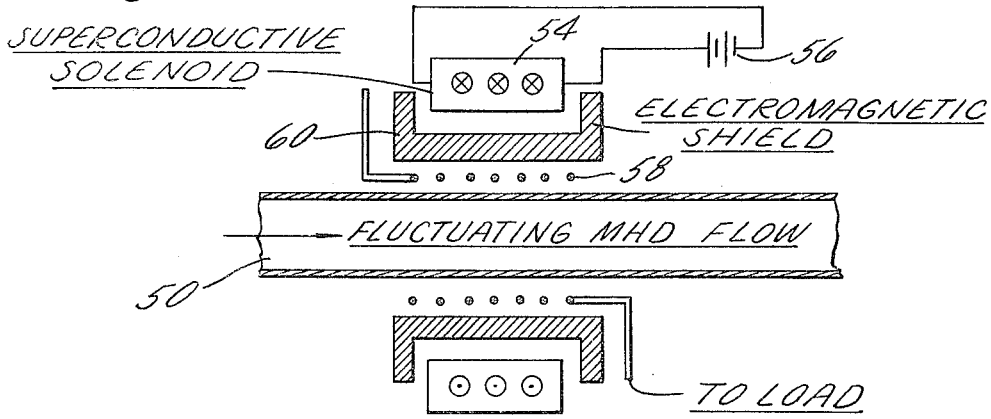
INVENTORS
RUSSELL G. MEYERAND, JR.
EDMUND C. LARY
BY Leonard F. Weblind
ATTORNEY 3,489,933
AC MAGNETOHYDRODYNAMIC GENERATOR UTILIZING A BISTABLE VALVE
Russell G. Meyerand, Jr., Glastonbury, and Edmund C. Lary, Vernon, Conn., assignors to United Aircraft Corporation, East Hartford, Conn., a corporation of Delaware
Filed Nov. 2, 1965, Ser. No. 506,098
Int. Cl. H02k 45/00; G21d 7/02
U.S. Cl. 310—11                7 Claims

ABSTRACT OF THE DISCLOSURE

An alternating current (AC) magnetohydrodynamic (MHD) generator is disclosed. The system includes a main duct of conductive gas flow which is alternately directed by means of a bistable valve to one of a pair of axial flow electrical generating passages with each of the passages having: (a) a separate power extraction coil surrounding the duct, (b) an electromagnetic shield around the coil, and (c) a powered solenoid coil around the shield.

---

This invention relates to magnetohydrodynamic generators (referred to herein as "MHD's") and more particularly to improved devices of this nature for producing pulsating or alternating current.

It is an object of this invention to provide a simplified MHD generator capable of producing an AC current by modulating the conductive fluid through the use of a bistable valve.

It is a further object of this invention to provide an improved AC current extraction mechanism for an MHD device.

These and other objects of this invention will become readily apparent from the following description of the drawing in which:

FIGURE 1 is a schematic illustration of the AC–MHD of this invention using a bistable fluid device.

FIGURES 2 and 3 are graphical illustrations of typical voltages in the system of FIGURE 1.

FIGURE 4 is a schematic view of a modified device current extraction from the MHD.

Various simple mechanisms have been sought for producing AC current directly from an MHD without the necessity of utilizing equipment for the conversion from DC to AC. One type of device for AC extraction from an MHD is illustrated in Patent No. 3,157,528, issued on Mar. 30, 1964, to Edmund C. Lary and Russell G. Meyerand, Jr. In the structure disclosed in that patent, electrical energy was utilized to form pulses or slugs in the conductive fluid. In this instance pneumatic means is provided for providing essentially the same result but in a more adaptable environment.

Referring to FIGURE 1, a main flow conduit 10 is intended to receive a conductive gas which is then fed to a bistable valve or fluid amplifier generally indicated at 12. A typical fluid amplifier is shown in Patent No. 3,016,063 for a fluid valve, issued to George F. Hausmann on Jan. 9, 1962. The valve 12 may be provided with flow modulator jets 14 and 16 and controlled in any suitable manner. By proper flow modulation of the jets 14 and 16, the main flow can be diverted into the power generating passages or legs 20 and 22 so that bits or slugs of fluid are passed alternatively to each of said legs.

Each of the legs 20 and 22 are surrounded by solenoid coils 24 and 26, respectively. These coils in turn are connected by lines 28, 30 and 32 with capacitors 34 and 36.

As stated above, the main gas flow is alternately passed through either leg of the valve through the use of modulator control jets 14 and 16. The slugs of flow so generated interact with the magnetic field produced by the solenoid coils through which the flow passes.

The motion of the conducting gas slugs creates periodical impulses in the coils as the gas passes through the magnetic field. The capacitors 34 and 36 are utilized external to the coils so as to make the resultant L–C circuit resonant with the period of the pneumatic bistable valve 12. The MHD device just described has an additional advantage in that electrodes are completely eliminated, thereby improving the generator efficiency and greatly reducing the materials problem. If extremely short power pulses at lower duty cycle are required, it is possible to employ a further advantage of this system. Thus as shown in FIGURE 2, the voltage across the capacitor will grow as a function of time, if the input of the generator is allowed to build up and is not dissipated in a load. The output could build up to extremely high levels at which time shorting the load across the capacitors would result in its repeated discharge.

Hence, the cycle could be repeated and short bursts of energy could be attained while utilizing the output of the MHD in a continuous fashion.

As seen in FIGURE 3, even greater efficiency can be realized by not discharging the capacitor fully and maintaining the strength of the interaction at a high level. It should be noted here that the solenoid coils 24 and 26 while extracting power also provide the self-supporting magnetic field necessary for the generation of power.

The fluid valve 12 by virtue of the modulated control in passages 14 and 16 may be driven at a frequency made equal to the resonant frequency of the L–C circuit for maximum self-excitation or growth or it may be made resonant in the form of an amplifier by a proper feedback of pressure signals to the flow modulation controls as for example as shown in Patent No. 3,185,166.

In addition any number of electrical phases may be obtained through the use of a plurality of coils spaced at varying distances on the legs of the valve.

If it is desired to avoid the necessity for using capacitors of the type shown (for self-excitation) in FIGURE 1, it may be desirable to provide a device of the type shown in FIGURE 4, where a conducting fluid flows in the passage 50 in fluctuating or pulsating fashion. A magnetic field is generated by a superconducting DC solenoid coil 54 schematically illustrated in being powered by a battery 56. A more complete description of superconducting solenoids or magnets will be found in an article entitled "Superconducting Magnets," by J. E. Kunzler and Morris Tanenbaum, appearing in "Scientific American" for June 1962, pages 60 through 67. The cutting of the magnetic field by the fluctuating MHD flow will generate pulsating or AC current in the load coil 58. Interposed between the solenoid 54 and the coil 58 is a shield 60 made of a high conductivity or Type 1 or soft superconducting material. The shield 60 is utilized to electromagnetically isolate the DC solenoid from the alternating currents produced in the load coil 58.

In operation the flux, which is expelled from the flow region by the bits of gas flow, is compressed outwardly between the passage 50 and the superconducting shield. When the particular flow perturbation of gas has passed through the generator region the compressed flux returns to the duct region cutting the conductors of the load coil 58 and thereby generating electrical power therein. The flux compression however takes the place of capacitive energy storage and enables the MHD generator to supply power to inductive loads or in general to loads of any impedance. Thus this form of generator is the analogue of the conventional alternator as contrasted with other known electrodeless AC–MHD devices which are of the induction type.

The further advantages of this device are that high gas temperatures, and thus high conductivities, are possible since insulating materials alone are used in contact with the working fluid. The electrodes constitute the major difficulty in the construction of MHD devices and also contribute the major losses due to sheath effects and boundary layer resistance. Moreover, the absence of electrodes obviates the difficulties usual with conventional channels associated with short circuiting of the Hall potential in the stream direction. Recent evidence indicates that these problems persist even with electrode segmentation. Thus the several sources of loss and inefficiency due to electrodes are eliminated, and construction is made both practical and simple.

The fact that the impressed magnetic field is DC rather than AC, as in other AC–MHD generators, permits the use of superconducting materials in the solenoid and therefore greatly increases field strength over those attainable by conventional means.

The feature of alternating compression of the flux by the conducting flow followed by expansion of the flux into the slower or less conducting flow produces an alternating EMF in the load coils which is essentially independent of the current therein (except for the effects of armature reaction which are well known in alternating machinery). For this reason, a current is produced in the load which is determined completely by the flow, impressed field, and load impedance, and self-excitation by the load current is not required. This produces a stable synchronous output of AC power to a load of any impedance. This is the case with a conventional alternator which is likewise excited by DC magnetization.

It is to be understood that the invention is not limited to the specific embodiment herein illustrated and described but may be used in other ways without departure from the spirit of this novel concept.

We claim:

1. An MHD comprising a main duct, means for inducing a flow of electrically conductive gas through said duct, a pair of axial flow power generating passages, a modulated bi-stable means receiving flow from said passage duct to alternately shift said flow into each of said generating passages, means for producing a magnetic field across the path of the fluid flowing in said generating passages, coil means adjacent the magnetic field producing means for extracting energy from each of said ducts for producing pulsating electrical current and circuit means connecting said coil means to an output including impedance means therefor.

2. An MHD comprising a main duct, means for inducing a flow of electrically conductive gas through said duct, a pair of power generating passages, a bistable means receiving flow from said duct to alternately shift said flow into each of said generating passages, means for producing a magnetic field in the path of the fluid flowing in said generating passages, coil means surrounding said generating passages and spaced inwardly from said magnetic field producing means for extracting energy from said ducts for producing pulsating electrical current, and a shield between said last two mentioned means forming an electromagnetic barrier therebetween.

3. A power extractor for an MHD having a duct and a pulsed conductive fluid flowing through the duct, a load coil surrounding the duct, an electro magnetic shield surrounding said coil, a solenoid coil surrounding said shield, and power means for said solenoid coil.

4. A power extractor according to claim 3 wherein said power means is a DC source.

5. A power extractor according to claim 3, in which said shield is superconducting.

6. A power extractor according to claim 4 in which said shield is superconducting.

7. A power extractor according to claim 3 wherein said solenoid coil is superconducting.

References Cited

UNITED STATES PATENTS

| | | | |
|---|---|---|---|
| 3,258,685 | 6/1966 | Horton | 324—34 |
| 3,327,223 | 6/1967 | Halista | 328—229 |

DAVID X. SLINEY, Primary Examiner